United States Patent
Hickey et al.

(10) Patent No.: US 6,697,696 B1
(45) Date of Patent: Feb. 24, 2004

(54) FAULT DETECTION CONTROL SYSTEM USING DUAL BUS ARCHITECTURE, AND METHODS OF USING SAME

(75) Inventors: Susan Hickey, Austin, TX (US); Elfido Coss, Jr., Austin, TX (US)

(73) Assignee: Advanced Micro Devices, Inc., Austin, TX (US)

(*) Notice: Subject to any disclaimer, the term of this patent is extended or adjusted under 35 U.S.C. 154(b) by 155 days.

(21) Appl. No.: 10/085,831

(22) Filed: Feb. 28, 2002

(51) Int. Cl.[7] .................................................. G06F 19/00
(52) U.S. Cl. ......................................... 700/121; 700/109
(58) Field of Search .......................... 700/108–110, 121; 702/182–186, 81–84

(56) References Cited

U.S. PATENT DOCUMENTS

| | | | |
|---|---|---|---|
| 6,456,894 B1 * | 9/2002 | Nulman ........................ | 700/121 |
| 6,556,882 B1 * | 4/2003 | Conboy et al. .............. | 700/108 |
| 2002/0116083 A1 * | 8/2002 | Schulze ....................... | 700/108 |
| 2002/0165636 A1 * | 11/2002 | Hasan .......................... | 700/121 |
| 2002/0183885 A1 * | 12/2002 | Goder et al. ................. | 700/121 |
| 2003/0014145 A1 * | 1/2003 | Reiss et al. .................. | 700/121 |

* cited by examiner

Primary Examiner—Leo Picard
Assistant Examiner—Zoila Cabrera
(74) Attorney, Agent, or Firm—Williams, Morgan & Amerson, P.C.

(57) ABSTRACT

The present invention is generally directed to a fault detection control system using dual bus architecture, and methods of using same. In one illustrative embodiment, the system comprises a plurality of process tools, each of the tools adapted to perform at least one process operation on at least one workpiece, at least one sensor that is operatively coupled to each of the process tools and adapted to sense at least one parameter associated with at least one process operation, an initial fault detection unit coupled to an instrument bus, the initial fault detection unit adapted to receive data from at least one sensor on each of the plurality of process tools via the instrument bus, and a primary fault detection unit operatively coupled to a manufacturing execution system and a system bus, the data from the sensors on each of the plurality of process tools being provided to the primary fault detection unit after the data is processed in the initial fault detection unit. In one illustrative embodiment, one of the methods of identifying faults in a manufacturing system comprises processing a workpiece in a process tool, obtaining data regarding the processing of the workpiece in the process tool via at least one sensor that is operatively coupled to the process tool, providing the data obtained by the at least one sensor to an initial fault detection unit that is adapted to receive the data via an instrument bus, the initial fault detection unit determining if an alarm condition exists, and providing the data to a primary fault detection control unit via a system bus after the data is processed through the initial fault detection unit.

28 Claims, 2 Drawing Sheets

FAULT DETECTION CONTROL SYSTEM USING DUAL BUS ARCHITECTURE, AND METHODS OF USING SAME

BACKGROUND OF THE INVENTION

1. Field of the Invention

This invention relates generally to the field of semiconductor device manufacturing and, more particularly, to a fault detection control system using dual bus architecture, and methods of using same.

2. Description of the Related Art

There is a constant drive within the semiconductor industry to increase the quality, reliability and throughput of integrated circuit devices, e.g., microprocessors, memory devices, and the like. This drive is fueled by consumer demands for higher quality computers and electronic devices that operate more reliably. These demands have resulted in a continual improvement in the manufacture of semiconductor devices, e.g., transistors, as well as in the manufacture of integrated circuit devices incorporating such transistors. Additionally, reducing the defects in the manufacture of the components of a typical transistor also lowers the overall cost per transistor as well as the cost of integrated circuit devices incorporating such transistors.

Generally, a set of processing steps is performed on a lot of wafers using a variety of processing tools, including photolithography steppers, etch tools, deposition tools, polishing tools, rapid thermal processing tools, implantation tools, etc. The technologies underlying semiconductor processing tools have attracted increased attention over the last several years, resulting in substantial refinements. However, despite the advances made in this area, many of the processing tools that are currently commercially available suffer certain deficiencies. In particular, such tools often lack advanced process data monitoring capabilities, such as the ability to provide historical parametric data in a user-friendly format, as well as event logging, real-time graphical display of both current processing parameters and the processing parameters of the entire run, and remote, i.e., local site and worldwide, monitoring. These deficiencies can engender non-optimal control of critical processing parameters, such as throughput, accuracy, stability and repeatability, processing temperatures, mechanical tool parameters, and the like. This variability manifests itself as within-run disparities, run-to-run disparities and tool-to-tool disparities that can propagate into deviations in product quality and performance, whereas an ideal monitoring and diagnostics system for such tools would provide a means of monitoring this variability, as well as provide means for optimizing control of critical parameters.

One technique for improving the operation of a semiconductor processing line includes using a factory wide control system to automatically control the operation of the various processing tools. The manufacturing tools communicate with a manufacturing framework or a network of processing modules. Each manufacturing tool is generally connected to an equipment interface. The equipment interface is connected to a machine interface which facilitates communications between the manufacturing tool and the manufacturing framework. The machine interface can generally be part of an advanced process control (APC) system. The APC system initiates a control script based upon a manufacturing model, which can be a software program that automatically retrieves the data needed to execute a manufacturing process. Often, semiconductor devices are staged through multiple manufacturing tools for multiple processes, generating data relating to the quality of the processed semiconductor devices. Typically, the manufacturing tools operate in accordance with predetermined scripts, or recipes. Some tools include internal monitoring systems that report various events, including errors, to a tool operator. Typically, these reported events are displayed on a printer or a display screen and/or are written to a data file.

The various processes performed in manufacturing integrated circuit devices, e.g., etching processes, deposition processes, ion implant processes, etc., are very complex and, in some cases, very difficult to control to the precise level required to manufacture today's integrated circuit products. Accordingly, such processes are monitored frequently, if not continuously, using various sensors or other metrology tools in an effort to insure that the process produces acceptable results. As a result of this monitoring, enormous volumes of data are collected, stored in one or more databases, and ultimately analyzed in an effort to obtain a better control of the various processes used to form the integrated circuit products. Typically, this data is provided to, or made available to, an overall manufacturing execution system (MES) that is responsible for, in general, management and control of many aspects of a semiconductor manufacturing facility. In some cases, the MES system also provides some form of fault detection analysis of the various processes used in forming the integrated circuit products. Typically, the fault detection involves analysis of some or all of the very large volume of data collected by the various sensors and metrology tools or devices. Unfortunately, performing fault detection analysis in this manner often results in an unacceptably slow response, given the large volume of data that is typically retrieved from a database, and cumbersome fault detection methodologies may result in reduced yields in semiconductor manufacturing operations and an overall decrease in manufacturing efficiencies.

The present invention is directed to overcoming, or at least reducing the effects of, one or more of the problems set forth above.

SUMMARY OF THE INVENTION

The present invention is generally directed to a fault detection control system using dual bus architecture, and methods of using same. In one illustrative embodiment, the system comprises a plurality of process tools, each of the tools adapted to perform at least one process operation on at least one workpiece, at least one sensor that is operatively coupled to each of the process tools and adapted to sense at least one parameter associated with at least one process operation, an initial fault detection unit coupled to an instrument bus, the initial fault detection unit adapted to receive data from at least one sensor on each of the plurality of process tools via the instrument bus, and a primary fault detection unit operatively coupled to a manufacturing execution system and a system bus, the data from the sensors on each of the plurality of process tools being provided to the primary fault detection unit after the data is processed in the initial fault detection unit.

In one illustrative embodiment, a method of identifying faults in a manufacturing system comprises processing a workpiece in a process tool, obtaining data regarding the processing of the workpiece in the process tool via at least one sensor that is operatively coupled to the process tool, providing the data obtained by the at least one sensor to an initial fault detection unit that is adapted to receive the data via an instrument bus, the initial fault detection unit determining if an alarm condition exists, and providing the data to a primary fault detection control unit via a system bus after the data is processed through the initial fault detection unit. In some cases, an alarm condition may be indicated if the data falls outside of a preselected acceptable range or exceeds an allowable value.

BRIEF DESCRIPTION OF THE DRAWINGS

The invention may be understood by reference to the following description taken in conjunction with the accompanying drawings, in which like reference numerals identify like elements, and in which.

Figure 1:
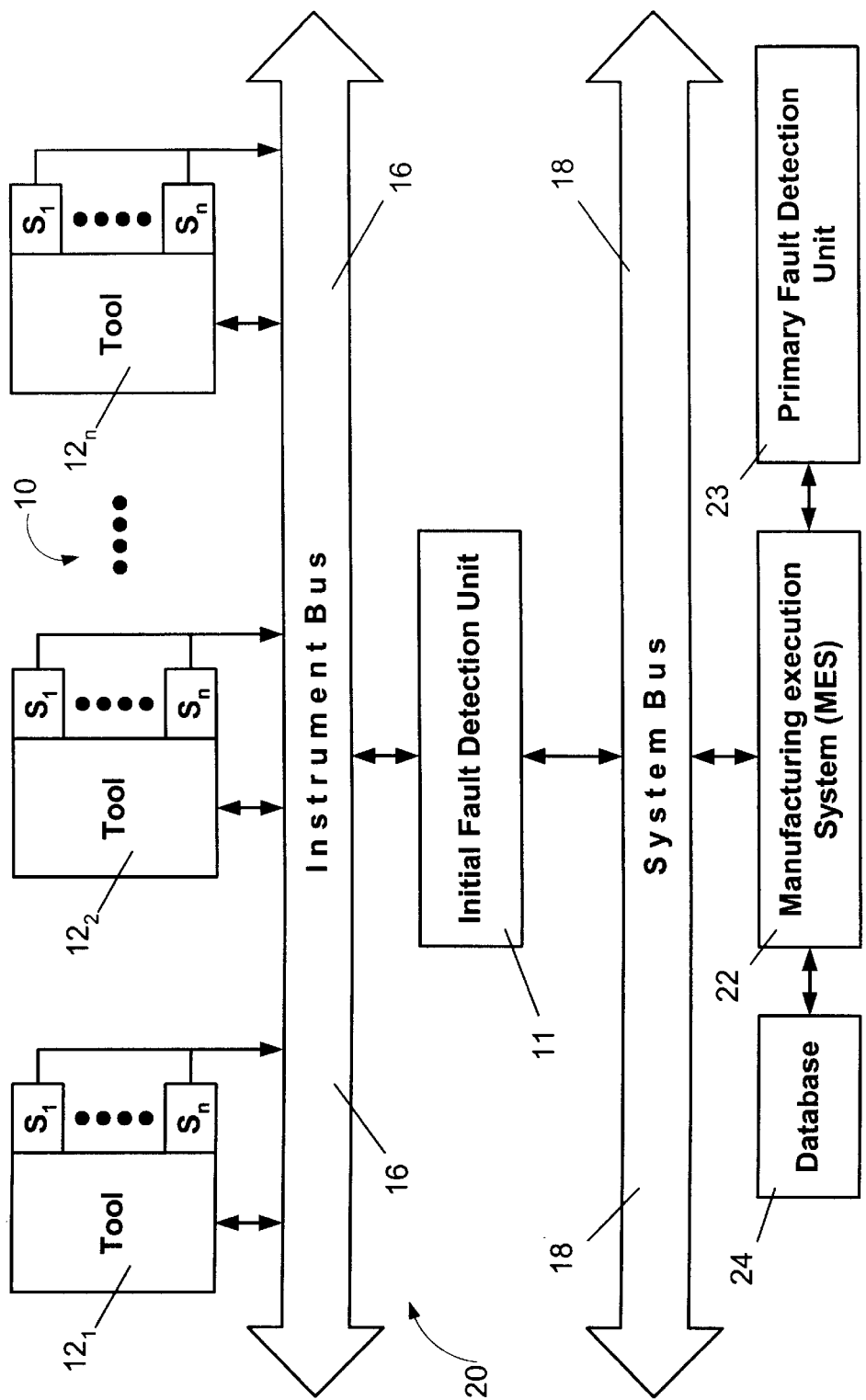
FIG. 1 is a simplified block diagram of an illustrative manufacturing system in accordance with one illustrative embodiment of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Referring to FIG. 1, a simplified block diagram of an illustrative manufacturing system 10 is provided. In the illustrated embodiment, the manufacturing system 10 is adapted to process semiconductor wafers, however, the invention is not so limited and may be applied to other types of manufacturing environments and other types of workpieces. A network 20 interconnects various components of the manufacturing system 10, allowing them to exchange information. The illustrative manufacturing system 10 includes a plurality of tools $12_1$–$12_n$ (where "n" may go to infinity), each of which may include an integrated or stand-alone computer (not shown) to allow each of the tools $12_1$–$12_n$ to interface with the network 20. The tools $12_1$–$12_n$ may be processing tools, such as photolithography tracks, etch tools, deposition tools, polishing tools, rapid thermal processing tools, implantation tools, etc., or metrology tools for measuring characteristics of the wafers being processed in the manufacturing system 10. A plurality of sensors $S_1 \ldots S_n$ is operatively coupled to each of the process tools $12_1$–$12_n$ for obtaining data regarding the processing operations performed by the process tools $12_1$–$12^n$.

Also depicted in FIG. 1 is a manufacturing execution system (MES) 22 that directs the high level operation of the manufacturing system 10 by directing the process flow of the manufacturing system 10. The MES unit 22 monitors the status of the various entities in the manufacturing system 10, including the tools $12_1$–$12_n$. The MES unit 22 may also contain or be operatively coupled to a primary fault detection unit 23. A database 24 is provided for storing data related to the operation of the manufacturing system 10, e.g., the status of the tools $12_1$–$12_n$, the status of workpieces, e.g., wafers, in the process flow, etc. The database 24 may store information in one or more data stores (not shown). The data may include pre-process and post-process metrology data, process state data, tool state data, wafer state data, lot state data, process flow activities (e.g., scheduled maintenance events, processing routes for lots of wafers), etc. The distribution of the processing and data storage functions amongst the different computers of the system 10 is generally conducted to provide independence and a central information store. Of course, a different number of computers may be used.

In the embodiment depicted in FIG. 1, the manufacturing system 10 further comprises an initial fault detection unit 11 that is operatively coupled to an instrument bus 16. The instrument bus 16 is operatively coupled to the process tools $12_1$–$12_n$, and to the various sensors $S_1$–$S_n$, associated with each of the tools $12_1$–$12_n$. In general, the initial fault detection unit 11 is provided such that it may obtain data sensed by the sensors $S_1$–$S_n$ for each of the tools $12_1$–$12_n$ more quickly via the instrument bus 16. That is, with the configuration depicted in FIG. 1, the initial fault detection unit 11 may receive data directly from the sensors $S_1$–$S_n$ for each of the tools $12_1$–$12_n$ without the need of having the sensor data traverse through the MES unit 22, be stored in the database 24, and be retrieved from the database 24. In this manner, depending upon the data obtained by the initial fault detection unit 11, various alarms and/or control actions may be taken more quickly than in the situation where all of the fault detection functionality and capability resides within or at the same operational level as the MES unit 22.

More particularly, the initial fault detection unit II may be programmed to identify that an alarm condition exists, take certain control actions and/or signal various alarm conditions if the sensor data, from the sensors $S_1$–$S_n$ obtained via the instrument bus 16, indicates that an unacceptable condition or value exists. For example, the initial fault detection unit 11 may determine if the data obtained by the sensors $S_1$–$S_n$ for one or more of the process tools $12_1$–$12_n$ exceeds or falls outside a preselected acceptable range. Alternatively, the initial fault detection unit 11 may determine that the data obtained by one or more of the sensors $S_1$–$S_n$ exceeds a given value. For example, a sensor may be provided to sense the presence of a particular undesirable chemical or by-product of the process operations performed in one of the tools $12_1$–$12_n$. Upon detection of any level of such chemical or by-product, an alarm condition may be indicated. If the data obtained by the initial fault detection unit 11 is within a preselected allowable value or limit, then no alarms or control actions may be taken by the initial fault detection unit 11. In that case, additional fault detection analysis may be performed by the primary fault detection unit 23. In a general sense, the initial fault detection unit 11 may be thought of as providing an initial, relatively coarse process control, whereas the primary fault detection unit 23 may provide control on a much finer level, and it may be more sophisticated in nature.

By way of example only, assuming that the tool 12 is a deposition tool, the sensor $S_I$ associated with tool $12_I$ may indicate that the thickness of the process layer (not shown) formed in the tool $12_I$ exceeds a preselected allowable limit. In that case, an alarm or error condition or signal may be generated by the initial fault detection unit 11 to stop process operations at tool $12_I$, because it is producing results that are completely outside an acceptable range. In that situation, the tool $12_I$ may be taken out of service until such time as it may be checked by appropriate personnel and re-qualified for service.

In the situation where the sensor data obtained by the initial fault detection unit 11 does not fall outside a preselected allowable value or range, then no alarm is given by the initial fault detection unit 11. Thereafter, the primary fault detection unit 23 may perform a more detailed analysis of the data retrieved from the database 24 and take various control actions in response thereto. In the case of a deposition tool, where the data obtained by the sensors $S_I$–$S_n$ for tool $12_I$ may indicate that the tool $12_I$ is still producing process layers within an overall acceptable thickness range, the primary fault detection unit 23 may analyze the data from the database 24 regarding the tool $12_I$ and determine that a control action nevertheless needs to be taken. For example, an analysis of the data by the primary fault detection unit 23 may reveal a trend indicating that the process tool $12_I$ is producing process layers of a thickness that begins to approach the upper limit of an allowable range. In that situation, the primary fault detection unit 23 may issue an associated command or warning with respect to the operation of the process tool $12_I$, i.e., it may provide an early warning type alarm to operating personnel.

Figure 2:
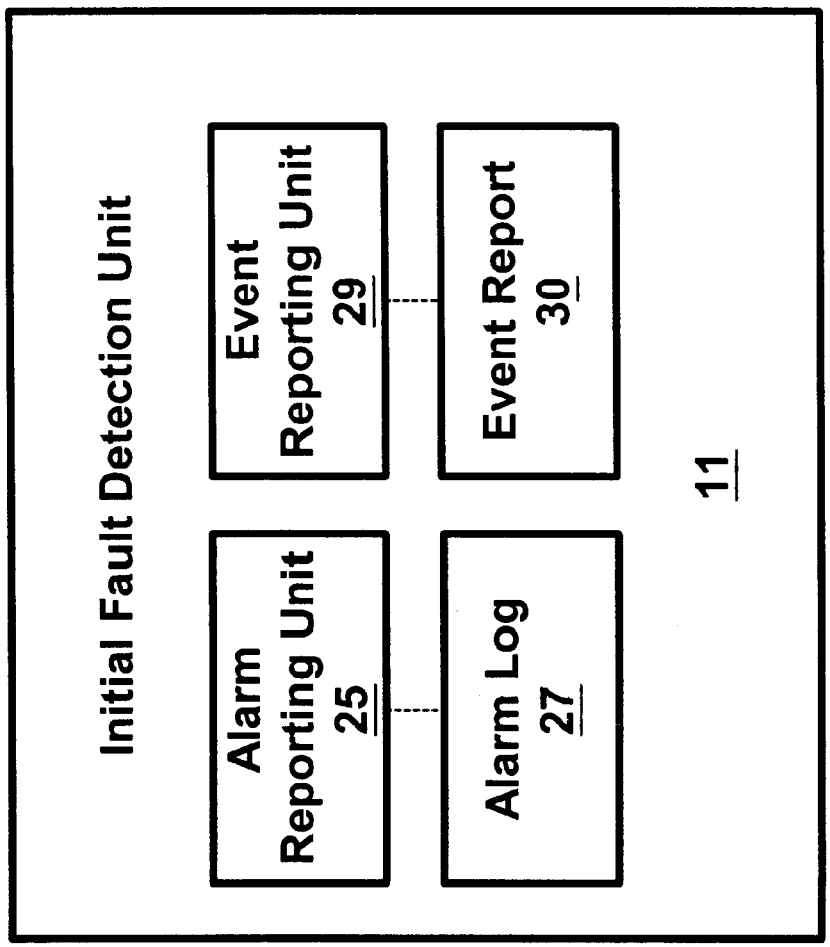
FIG. 2 is an enlarged, simplified block diagram of an initial fault detection unit in accordance with one illustrative embodiment of the present invention.

As depicted in FIG. 2, the initial fault detection unit 11 may be configured to include an alarm reporting unit 25 adapted to output the alarm conditions using a display, printer, or computer data file for review by an operator of one or more of the tools $12^1$–$12_n$. The output of the alarm reporting unit 25 is represented as an alarm log 27. The alarm reporting unit 25 may output traditional alarm information, including, for example, an alarm number and an alarm text. The initial fault detection unit 11 may also include an event reporting unit 29 adapted to generate reports of events occurring on one or more of the tools $12_I$–$12_n$, such as initiation and completion of processing tasks as well as alarm conditions. In the illustrated embodiment, the event reporting unit 29 may employ an industry-standard report format for outputting event reports 30. The event report 30 format is defined in the following industry standards: SEMI Equipment Communications Standard 1 (SECS-I) Message Transfer (E4); SEMI Equipment Communications Standard 2 Message Content (SECS-II) (E5); and Generic Model for Communications and Control of Manufacturing Equipment (GEM) (E30). An event report 30 formatted in accordance with these standards is commonly referred to as a SECS/GEM event report (S6F11—Stream 6 function 11).

The particular corrective action may vary depending on the particular implementation and the nature of the alarm condition. Exemplary automatic actions include automatically shutting the tool down, aborting the current wafer, suspending subsequent wafers, etc. In suspending subsequent wafers, the equipment interface may preclude processing of wafers having the same operating recipes while allowing processing of other wafers having different recipes (i.e., the recipe requirements for the different recipe may not be affected by the alarm condition). Moreover, the illustrative sensors SISn associated with the process tools $12_I$–$12_n$ may obtain a variety of different types of data regarding the process operations of the process tools $12_I$–$12_n$. Such data may include, but is not limited to, pressure, temperature, gas flow rates, time, the location of wafers, the detection of particular chemicals or substances, the thickness of process layers formed during such processes, the planarity of a surface of a process layer, the end or completeness of an etch process, etc. Additionally, such data may be obtained using a variety of known metrology tools, e.g., a pressure gauge, an optical sensor, a temperature gauge, an ellipsometer, a profilometer, a gas flow meter, etc. Thus, the particular corrective action taken, the type of data retrieved by the sensors $S_I$–$S_n$ and analyzed in the initial fault detection unit 11, as well as the type of instrumentation used to obtain such data, should not be considered a limitation of the present invention unless such limitations are clearly set forth in the appended claims.

An exemplary information exchange and process control framework suitable for use in the manufacturing system 10 is an Advanced Process Control (APC) framework, such as may be implemented using the Catalyst system offered by KLA-Tencor, Inc. The Catalyst system uses Semiconductor Equipment and Materials International (SEMI) Computer Integrated Manufacturing (CIM) Framework compliant system technologies and is based on the Advanced Process Control (APC) Framework. CIM (SEMI E81-0699—Provisional Specification for CIM Framework Domain Architecture) and APC (SEMI E93-0999—Provisional Specification for CIM Framework Advanced Process Control Component) specifications are publicly available from SEMI, which is headquartered in Mountain View, Calf.

Portions of the invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

The present invention is generally directed to a fault detection control system using dual bus architecture, and methods of using same. In one illustrative embodiment, the system comprises a plurality of process tools, each of the tools adapted to perform at least one process operation on at least one workpiece, at least one sensor that is operatively coupled to each of the process tools and adapted to sense at least one parameter associated with at least one process operation, an initial fault detection unit coupled to an instrument bus, the initial fault detection unit adapted to receive data from at least one sensor on each of the plurality of process tools via the instrument bus, and a primary fault detection unit operatively coupled to a manufacturing execution system and a system bus, the data from the sensors on each of the plurality of process tools being provided to the primary fault detection unit after the data is processed in the initial fault detection unit.

In one illustrative embodiment, a method of identifying faults in a manufacturing system comprises processing a workpiece in a process tool, obtaining data regarding the processing of the workpiece in the process tool via at least one sensor that is operatively coupled to the process tool, providing the data obtained by the at least one sensor to an initial fault detection unit that is adapted to receive the data via an instrument bus, the initial fault detection unit determining if an alarm condition exists, and providing the data to a primary fault detection control unit via a system bus after the data is processed through the initial fault detection unit. In some embodiments, an alarm condition may exist if the data falls outside of a preselected acceptable range or if the data exceeds a preselected value.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A system, comprising:
    a plurality of process tools, each of said tools adapted to perform at least one process operation on at least one workpiece;
    at least one sensor operatively coupled to each of said process tools, said at least one sensor adapted to sense at least one parameter associated with said at least one process operation;
    an initial fault detection unit coupled to an instrument bus, said initial fault detection unit adapted to receive data from said at least one sensor on each of said plurality of process tools via said instrument bus; and
    a primary fault detection unit operatively coupled to a manufacturing execution system and a system bus, said data from said at least one sensor on each of said plurality of process tools being provided to said primary fault detection unit after said data is processed in said initial fault detection unit.

2. The system of claim 1, wherein each of said plurality of process tools is comprised of at least one of an etching tool, a deposition tool, an ion implant tool, a chemical mechanical polishing tool, a photolithography tool, a rapid thermal anneal tool and a furnace.

3. The system of claim 1, wherein said at least one workpiece is comprised of at least one semiconducting wafer.

4. The system of claim 1, wherein said at least one sensor operatively coupled to each of said process tools comprises at least one of a pressure sensor, a temperature sensor, a thickness sensor, a gas flow rate monitor, an ellipsometer and a clock.

5. The system of claim 1, wherein said initial fault detection unit comprises at least one computer.

6. The system of claim 1, wherein said manufacturing execution system comprises at least one computer.

7. The system of claim 1, further comprising a data storage unit operatively coupled to said manufacturing execution system, said data storage unit adapted to store data obtained from said at least one sensor on each of said plurality of process tools.

8. The system of claim 1, wherein said manufacturing execution system comprises at least one computer and wherein said primary fault detection unit comprises a stand-alone computer that is separate from said at least one computer comprising said manufacturing execution system.

9. A system, comprising:
    a plurality of process tools, each of said tools adapted to perform at least one process operation on at least one semiconducting wafer;
    a plurality of sensors operatively coupled to each of said process tools, said plurality of sensors adapted to sense a plurality of parameters associated with said at least one process operation;
    an initial fault detection unit coupled to an instrument bus, said initial fault detection unit adapted to receive data from said plurality of sensors on each of said plurality of process tools via said instrument bus; and
    a primary fault detection unit operatively coupled to a manufacturing execution system and a system bus, said data from said plurality of sensors on each of said plurality of process tools being provided to said primary fault detection unit after said data is processed in said initial fault detection unit.

10. The system of claim 9, wherein each of said plurality of process tools is comprised of at least one of an etching tool, a deposition tool, an ion implant tool, a chemical mechanical polishing tool, a photolithography tool, a rapid thermal anneal tool and a furnace.

11. The system of claim 9, wherein each of said plurality of sensors comprises at least one of a pressure sensor, a temperature sensor, a thickness sensor, a gas flow rate monitor, an ellipsometer and a clock.

12. The system of claim 9, wherein said initial fault detection unit comprises at least one computer.

13. The system of claim 9, wherein said manufacturing execution system comprises at least one computer.

14. The system of claim 9, further comprising a data storage unit operatively coupled to said manufacturing execution system, said data storage unit adapted to store data obtained from said plurality of sensors.

15. The system of claim 9, wherein said manufacturing execution system comprises at least one computer and wherein said primary fault detection unit comprises a stand-alone computer that is separate from said at least one computer comprising said manufacturing execution system.

16. A method of identifying faults in a manufacturing system, comprising:

processing a workpiece in a process tool;

obtaining data regarding said processing of said workpiece in said process tool via at least one sensor that is operatively coupled to said process tool;

providing said data obtained by said at least one sensor to an initial fault detection unit that is adapted to receive said data via an instrument bus, said initial fault detection unit determining if an alarm condition exists; and providing said data to a primary fault detection control unit via a system bus after said data is processed through said initial fault detection unit.

17. The method of claim 16, wherein processing a workpiece in a process tool comprises processing a semiconducting wafer in a process tool.

18. The method of claim 16, wherein processing a workpiece in a process tool comprises processing a semiconducting wafer in a process tool comprised of at least one of an etch tool, a deposition tool, a photolithography tool, an ion implant tool, a chemical mechanical polishing tool, a rapid thermal anneal chamber and a furnace.

19. The method of claim 16, wherein obtaining data regarding said processing of said workpiece in said process tool via at least one sensor that is operatively coupled to said process tool comprises obtaining data regarding said processing of said workpiece in said process tool via at least one sensor that is operatively coupled to said process tool, said data comprised of at least one of a temperature, a pressure, a gas flow rate, a thickness of a process layer formed during said processing of said workpiece, a planarity of a surface of a process layer, a location of a workpiece within said tool, and a duration of said process.

20. The method of claim 16, wherein obtaining data regarding said processing of said workpiece in said process tool via at least one sensor that is operatively coupled to said process tool comprises obtaining data regarding said processing of said workpiece in said process tool via at least one sensor that is operatively coupled to said process tool, said at least one sensor comprised of at least one of a temperature sensor, a pressure sensor, a gas flow rate sensor, a thickness sensor, an optical sensor, an ellipsometer, a profilometer and a clock.

21. The method of claim 16, wherein said initial fault detection unit determines if an alarm condition exists if said data falls outside of a preselected acceptable range.

22. The method of claim 16, wherein said initial fault detection unit determines if an alarm condition exists if said data exceeds a preselected value.

23. The method of claim 16, wherein said initial fault detection unit is comprised of at least one computer.

24. The method of claim 16, further comprising storing said data in a data storage unit after said data is processed through said initial fault detection unit, said data storage unit being accessible by said primary fault detection unit.

25. A method of identifying faults in a manufacturing system, comprising:

processing a semiconducting wafer in a process tool;

obtaining data regarding said processing of said semiconducting wafer in said process tool via at least one sensor that is operatively coupled to said process tool;

providing said data obtained by said at least one sensor to an initial fault detection unit that is adapted to receive said data via an instrument bus, said initial fault detection unit determining if an alarm condition exists if said data falls outside of a preselected acceptable range;

providing said data to a primary fault detection control unit via a system bus after said data is processed through said initial fault detection unit; and storing said data in a data storage unit after said data is processed through said initial fault detection unit, said data storage unit being accessible by said primary fault detection unit.

26. The method of claim 25, wherein processing a semiconductor wafer in a process tool comprises processing a semiconducting wafer in a process tool comprised of at least one of an etch tool, a deposition tool, a photolithography tool, an ion implant tool, a chemical mechanical polishing tool, a rapid thermal anneal chamber and a furnace.

27. The method of claim 25, wherein obtaining data regarding said processing of said semiconducting wafer in said process tool via at least one sensor that is operatively coupled to said process tool comprises obtaining data regarding said processing of said semiconducting wafer in said process tool via at least one sensor that is operatively coupled to said process tool, said data comprised of at least one of a temperature, a pressure, a gas flow rate, a thickness of a process layer formed during said processing of said semiconducting wafer, a location of a semiconducting wafer within said tool, and a duration of said process.

28. The method of claim 25, wherein obtaining data regarding said processing of said semiconducting wafer in said process tool via at least one sensor that is operatively coupled to said process tool comprises obtaining data regarding said processing of said semiconducting wafer in said process tool via at least one sensor that is operatively coupled to said process tool, said at least one sensor comprised of at least one of a temperature sensor, a pressure sensor, a gas flow rate sensor, a thickness sensor, an ellipsometer, a profilometer, an optical sensor and a clock.

* * * * *